United States Patent
Hayashi

(10) Patent No.: US 12,403,996 B2
(45) Date of Patent: Sep. 2, 2025

(54) MARINE POWER SUPPLY SYSTEM AND METHOD FOR CONTROLLING MARINE POWER SUPPLY SYSTEM

(71) Applicant: YAMAHA HATSUDOKI KABUSHIKI KAISHA, Iwata (JP)

(72) Inventor: Takuya Hayashi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 1031 days.

(21) Appl. No.: 17/211,984

(22) Filed: Mar. 25, 2021

(65) Prior Publication Data

US 2021/0300516 A1  Sep. 30, 2021

(30) Foreign Application Priority Data

Mar. 27, 2020 (JP) ................... 2020-058945

(51) Int. Cl.
| | | |
|---|---|---|
| *B63H 21/20* | (2006.01) | |
| *B63B 79/40* | (2020.01) | |
| *B63H 20/00* | (2006.01) | |

(52) U.S. Cl.
CPC ............ *B63H 21/20* (2013.01); *B63B 79/40* (2020.01); *B63H 20/00* (2013.01); *B63H 2020/003* (2013.01); *B63H 2021/202* (2013.01)

(58) Field of Classification Search
CPC .. B63H 21/20; B63H 20/00; B63H 2020/003; B63H 2021/202; B63H 2021/216; B63H 21/21; B63B 79/40; Y02T 70/5236
See application file for complete search history.

(56) References Cited

U.S. PATENT DOCUMENTS

| | | | | |
|---|---|---|---|---|
| 3,602,181 | A * | 8/1971 | Harris ................. | B63H 20/007 440/7 |
| 5,685,802 | A * | 11/1997 | Kanno .................... | F02B 75/20 290/40 C |
| 8,944,865 | B1 * | 2/2015 | Krabacher ............ | B63H 21/21 440/1 |
| 2010/0248560 | A1 | 9/2010 | Ito et al. | |
| 2017/0291672 | A1 * | 10/2017 | Maejima ............... | B63H 21/21 |
| 2017/0349256 | A1 | 12/2017 | Nakamura | |
| 2022/0089279 | A1 * | 3/2022 | Rosen .................... | B64C 29/02 |
| 2022/0334151 | A1 * | 10/2022 | Bani Shamseh ...... | H02M 7/537 |

FOREIGN PATENT DOCUMENTS

| | | |
|---|---|---|
| EP | 3 613 663 A1 | 2/2020 |
| JP | 11-266502 A | 9/1999 |
| JP | 2011-051416 A | 3/2011 |
| JP | 2013-039888 A | 2/2013 |
| JP | 2017-218016 A | 12/2017 |

OTHER PUBLICATIONS

Official Communication issued in corresponding European Patent Application No. 21164874.6, dated Sep. 16, 2021.

* cited by examiner

*Primary Examiner* — Yufeng Zhang
(74) *Attorney, Agent, or Firm* — Keating & Bennett, LLP

(57) ABSTRACT

A marine power supply system includes a first battery to supply power to an electric motor, a battery switch to be manually switched between an on-state in which the first battery is used and an off-state in which the first battery is not used, and a notifier to provide a notification indicating that the battery switch is in the off-state when the battery switch is in the off-state.

20 Claims, 5 Drawing Sheets

MARINE POWER SUPPLY SYSTEM AND METHOD FOR CONTROLLING MARINE POWER SUPPLY SYSTEM

CROSS REFERENCE TO RELATED APPLICATIONS

This application claims the benefit of priority to Japanese Patent Application No. 2020-058945 filed on Mar. 27, 2020. The entire contents of this application are hereby incorporated herein by reference.

BACKGROUND OF THE INVENTION

1. Field of the Invention

The present invention relates to a marine power supply system and a method for controlling a marine power supply system.

2. Description of the Related Art

A marine power supply system that supplies power to a marine propulsion unit including an engine and an electric motor and a method for controlling a marine power supply system are known in general. Such a marine power supply system and a method for controlling a marine power supply system are disclosed in Japanese Patent Laid-Open No. 2017-218016, for example.

Japanese Patent Laid-Open No. 2017-218016 discloses a marine vessel including a marine propulsion device including an engine and an electric motor. The marine propulsion device includes a propeller. Both the engine and the electric motor generate power to rotate the propeller. The marine vessel includes a battery to supply power to the electric motor. The electric motor rotates the propeller using the power from the battery.

Although not described in Japanese Patent Laid-Open No. 2017-218016, the marine vessel includes a battery switch to be manually switched between a state in which the battery is used (hereinafter referred to as an "on-state") and a state in which the battery is not used (hereinafter referred to as an "off-state") in order to significantly reduce or prevent discharge from the battery due to dark current, for example, during storage of the marine vessel. In a marine vessel including an electric motor as disclosed in Japanese Patent Laid-Open No. 2017-218016, a battery switch is conceivably provided between the electric motor and a battery. However, conceivably in the marine vessel as described above, when the engine is driven, the propeller rotates to propel the marine vessel only by driving the engine. Thus, the marine vessel conceivably travels without a user being aware that the battery switch is in an off-state. Therefore, a marine power supply system and a method for controlling a marine power supply system that significantly reduce or prevent traveling of a marine vessel without a user being aware that a battery switch is in an off-state even when power is supplied to a marine propulsion device (marine propulsion unit) including an engine and an electric motor have been desired.

SUMMARY OF THE INVENTION

Preferred embodiments of the present invention provide marine power supply systems and methods for controlling marine power supply systems that each significantly reduce or prevent traveling of marine vessels without users being aware that battery switches are in off-states even when power is supplied to marine propulsion units including engines and electric motors.

A marine power supply system according to a preferred embodiment of the present invention supplies power to a marine propulsion unit including a propulsion generator that generates a propulsive force to propel a marine vessel, an engine that drives the propulsion generator, and an electric motor that drives the propulsion generator, and includes a first battery to supply power to the electric motor, a battery switch to be manually switched between an on-state in which the first battery is used and an off-state in which the first battery is not used, and a notifier to provide a notification indicating that the battery switch is in the off-state when the battery switch is in the off-state.

A marine power supply system according to a preferred embodiment of the present invention includes the notifier to provide the notification indicating that the battery switch is in the off-state when the battery switch is in the off-state. Accordingly, the notifier notifies a user that the battery switch is in the off-state. Consequently, even when power is supplied to the marine propulsion unit including the engine and the electric motor, traveling of the marine vessel without the user being aware that the battery switch is in the off-state is significantly reduced or prevented.

A marine power supply system according to a preferred embodiment of the present invention preferably further includes a controller configured or programmed to control the notifier to provide the notification indicating that the battery switch is in the off-state when the battery switch is in the off-state. Accordingly, the notifier is easily controlled using the controller.

In such a case, the notifier preferably includes a display, and the controller is preferably configured or programmed to control the display to provide a display indicating that the battery switch is in the off-state when the battery switch is in the off-state. Accordingly, the user easily recognizes that the battery switch is in the off-state by visually recognizing the display.

In a marine power supply system including the display, the controller is preferably configured or programmed to control the display to display message information indicating that the battery switch is in the off-state when the battery switch is in the off-state. Accordingly, the user easily recognizes that the battery switch is in the off-state by reading the message information on the display.

In a marine power supply system including the controller, the controller is preferably configured or programmed to perform a control to switch between an engine driving state in which the propulsion generator is driven by the engine and an electric motor driving state in which the propulsion generator is driven by the electric motor. Accordingly, the controller functions as a controller for a hybrid system configured or programmed to perform a control to switch between the engine driving state and the electric motor driving state, and also functions as a controller configured or programmed to control the notifier. Consequently, as compared with a case in which the controller for the hybrid system is separated from the controller configured or programmed to control the notifier, a complex structure of the marine vessel including the marine power supply system is significantly reduced or prevented.

A marine power supply system that switches between the engine driving state and the electric motor driving state preferably further includes a starter connected to the engine to start the engine, and a second battery provided separately from the first battery to supply power to the starter, and the controller is preferably configured or programmed to control the notifier to provide the notification indicating that the battery switch is in the off-state and to control the engine to start when power is supplied from the second battery to the starter and when the battery switch is in the off-state. Accordingly, the engine is started even when the notification indicating that the battery switch is in the off-state is provided. Consequently, even when the battery switch is in the off-state, the engine is started when the user desires to start the engine.

A marine power supply system according to a preferred embodiment of the present invention preferably further includes a detector provided between the battery switch and the electric motor to detect that the battery switch is in the off-state. Accordingly, the user easily recognizes that the battery switch is in the off-state through the notifier based on the detection result detected by the detector.

In such a case, a marine power supply system preferably further includes a power converter to convert DC power from the battery switch into AC power to supply the AC power to the electric motor, and a power conversion controller configured or programmed to control operation of the power converter and to also define and function as the detector. Accordingly, it is not necessary to provide a dedicated detector to detect that the battery switch is in the off-state. Thus, an increase in the number of components of the marine power supply system is significantly reduced or prevented, and a complex structure of the marine power supply system is significantly reduced or prevented.

A marine power supply system including the power conversion controller preferably further includes a third battery provided separately from the first battery to supply power to the power conversion controller. Accordingly, even when power is not supplied from the first battery to the power conversion controller, the power conversion controller detects that the battery switch is in the off-state using the power from the third battery.

A marine power supply system including the detector preferably further includes a storage to store a detection result detected by the detector. Accordingly, the user or a maintenance worker is able to retroactively confirm the detection result stored in the storage.

In a marine power supply system according to a preferred embodiment of the present invention, the first battery preferably includes a plurality of first batteries, the battery switch preferably includes a plurality of battery switches, and the notifier preferably provides a notification indicating that at least one of the plurality of battery switches is in the off-state when the at least one of the plurality of battery switches is in the off-state. Accordingly, even when the plurality of battery switches are provided, the user is notified that at least one of the plurality of battery switches is in the off-state when at least one of the plurality of battery switches is in the off-state.

A method for controlling a marine power supply system that supplies power to a marine propulsion unit including a propulsion generator that generates a propulsive force to propel a marine vessel, an engine that drives the propulsion generator, and an electric motor that drives the propulsion generator according to a preferred embodiment of the present invention includes determining that a battery switch to be manually switched between an on-state in which a first battery that supplies power to the electric motor is used and an off-state in which the first battery is not used is in the off-state, and providing a notification indicating that the battery switch is in the off-state based on the determining that the battery switch is in the off-state.

In a method for controlling a marine power supply system according to a preferred embodiment of the present invention, similarly to the marine power supply system according to preferred embodiments of the present invention described above, even when power is supplied to the marine propulsion unit including the engine and the electric motor, traveling of the marine vessel without a user being aware that the battery switch is the off-state is significantly reduced or prevented.

In a method for controlling the marine power supply system according to a preferred embodiment of the present invention, the providing of the notification preferably includes providing a display indicating that the battery switch is in the off-state when the battery switch is in the off-state. Accordingly, the user easily recognizes that the battery switch is in the off-state by visually recognizing the display.

In such a case, the providing of the notification preferably includes displaying message information indicating that the battery switch is in the off-state when the battery switch is in the off-state. Accordingly, the user easily recognizes that the battery switch is in the off-state by reading the message information.

In a method for controlling the marine power supply system according to a preferred embodiment of the present invention, the marine power supply system preferably further includes a starter connected to the engine to start the engine, and a second battery provided separately from the first battery to supply power to the starter, and the providing of the notification preferably includes providing the notification indicating that the battery switch is in the off-state and starting the engine when power is supplied from the second battery to the starter and when the battery switch is in the off-state. Accordingly, the engine is started even when the notification indicating that the battery switch is in the off-state is provided. Consequently, even when the battery switch is in the off-state, the engine is started when the user desires to start the engine.

A method for controlling the marine power supply system according to a preferred embodiment of the present invention preferably further includes detecting that the battery switch is in the off-state, and the providing of the notification preferably includes providing the notification indicating that the battery switch is in the off-state based on detecting that the battery switch is in the off-state. Accordingly, it is detected that the battery switch is in the off-state. When it is detected that the battery switch is in the off-state, the user is notified that that the battery switch is in the off-state.

In such a case, the detecting preferably includes detecting that the battery switch is in the off-state by using a power conversion controller configured or programmed to control operation of a power converter that converts DC power from the battery switch into AC power to supply the AC power to the electric motor. Accordingly, the power conversion controller detects that the battery switch is in the off-state without providing a detector separately from the power conversion controller.

A method for controlling the marine power supply system including the detecting that the battery switch is in the off-state by using the power conversion controller, the marine power supply system preferably further includes a third battery provided separately from the first battery to supply power to the power conversion controller, and the detecting preferably includes detecting that the battery switch is in the off-state by using the power conversion controller using the power from the third battery. Accordingly, even when power is not supplied from the first battery to the power conversion controller, the power conversion controller detects that the battery switch is in the off-state using the power from the third battery.

A method for controlling the marine power supply system according to a preferred embodiment of the present invention preferably further includes storing a detected detection result after the detecting. Accordingly, the user or a maintenance worker is able to retroactively confirm the stored detection result.

In a method for controlling the marine power supply system according to a preferred embodiment of the present invention, the first battery preferably includes a plurality of first batteries, the battery switch preferably includes a plurality of battery switches, and the providing of the notification preferably includes providing a notification indicating that at least one of the plurality of battery switches is in the off-state when the at least one of the plurality of battery switches is in the off-state. Accordingly, even when the plurality of battery switches are provided, the user is notified that at least one of the plurality of battery switches is in the off-state when at least one of the plurality of battery switches is in the off-state.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of a marine vessel 100 according to preferred embodiments of the present invention is now described with reference to FIGS. 1 to 7. In the figures, arrow FWD represents the forward movement direction of the marine vessel 100, and arrow BWD represents the reverse movement direction of the marine vessel 100.

Figure 1:
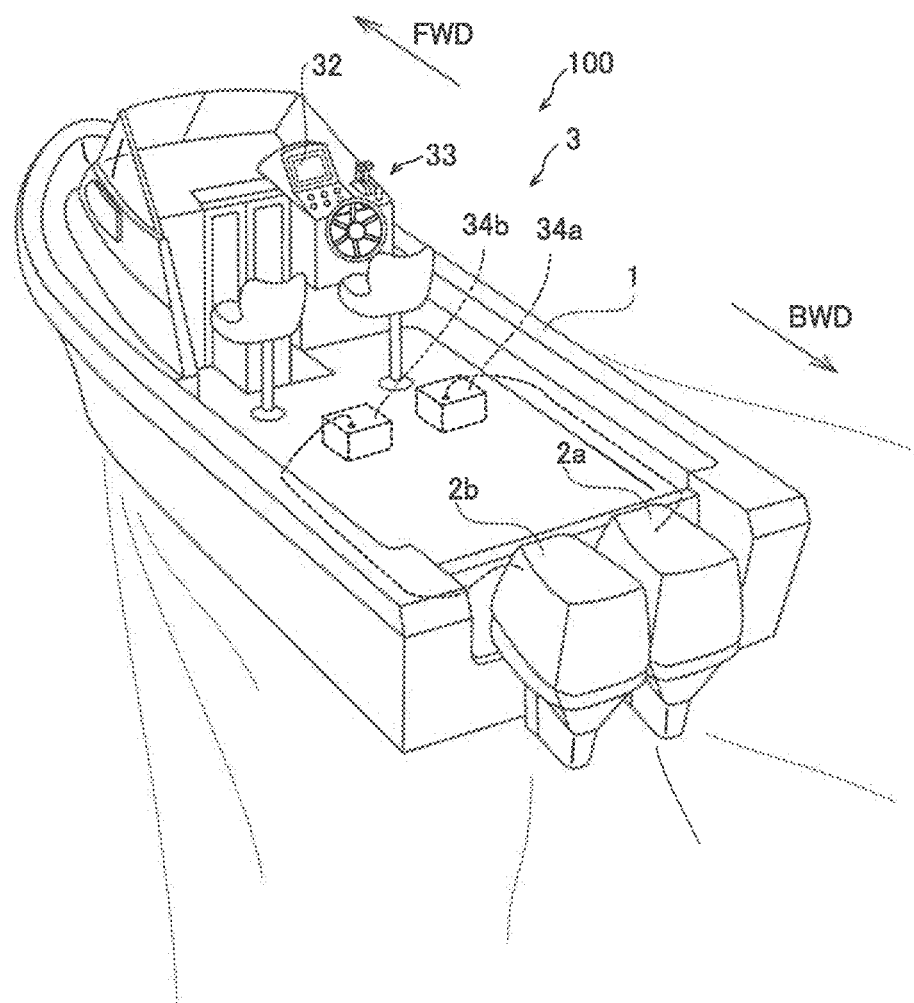
FIG. 1 is a perspective view schematically showing a marine vessel including a marine vessel control system according to a preferred embodiment of the present invention.

As shown in FIG. 1, the marine vessel 100 includes a hull 1, outboard motors 2a and 2b, and a marine vessel control system 3. That is, the marine vessel 100 is an outboard motor boat. Furthermore, the marine vessel control system 3 is a power supply system that supplies power to the outboard motors 2a and 2b. The outboard motors 2a and 2b are examples of a "marine propulsion unit". The marine vessel control system 3 is an example of a "marine power supply system".

Figure 2:
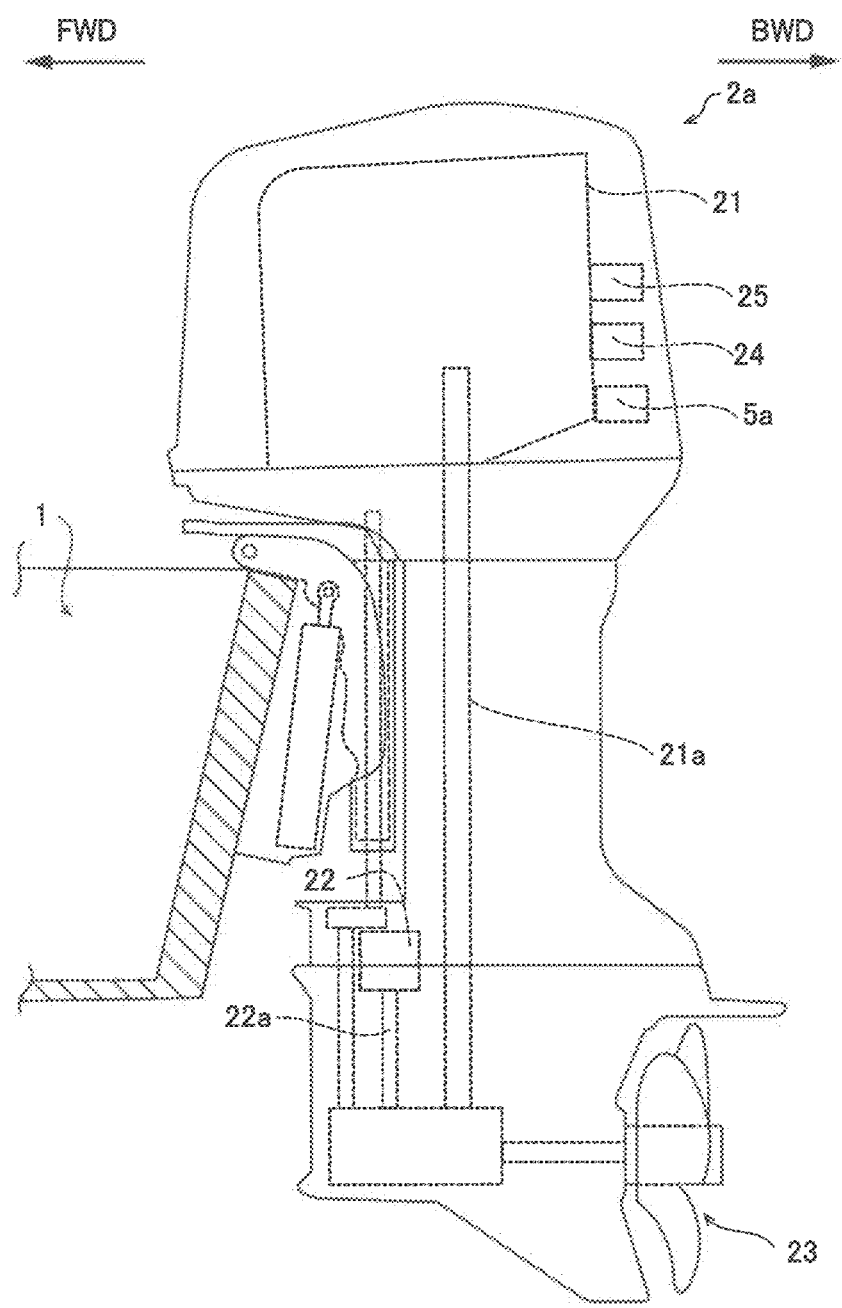
FIG. 2 is a side view illustrating the structure of an outboard motor according to a preferred embodiment of the present invention.

The outboard motors 2a and 2b are attached to the hull 1. For example, the outboard motors 2a and 2b are located side by side in a right-left direction. As shown in FIG. 2, the outboard motor 2a includes an engine 21, an electric motor 22, a propeller 23, an engine ECU (electronic control unit) 24, and a starter motor 25. The structure of the outboard motor 2b is the same as that of the outboard motor 2a. The propeller 23 is an example of a "propulsion generator". The starter motor 25 is an example of a "starter".

The engine 21 drives the propeller 23. Specifically, the engine 21 is an internal combustion engine driven by combustion of gasoline, light oil, or the like. The engine 21 is connected to the propeller 23 via a drive shaft 21a, etc. A driving force (rotational force) is transmitted the engine 21 to the propeller 23 such that the propeller 23 rotates, and the marine vessel 100 (hull 1) is propelled.

The electric motor 22 drives the propeller 23. The electric motor 22 is a motor. The electric motor 22 provided in the outboard motor 2a is driven using power from an electric motor battery 34a described below. The electric motor 22 provided in the outboard motor 2b is driven using power from an electric motor battery 34b described below. Specifically, the electric motor 22 provided in the outboard motor 2a is driven using power converted by an inverter device 5a described below. The electric motor 22 provided in the outboard motor 2b is driven using power converted by an inverter device 5b described below. The electric motor 22 is connected to the propeller 23 via a shaft 22a, a propeller shaft, etc. A driving force (rotational force) is transmitted from the electric motor 22 to the propeller 23 such that the propeller 23 rotates, and the marine vessel 100 (hull 1) is propelled.

The propeller 23 is positioned in the water, and rotates to generate a propulsive force.

Figure 3:
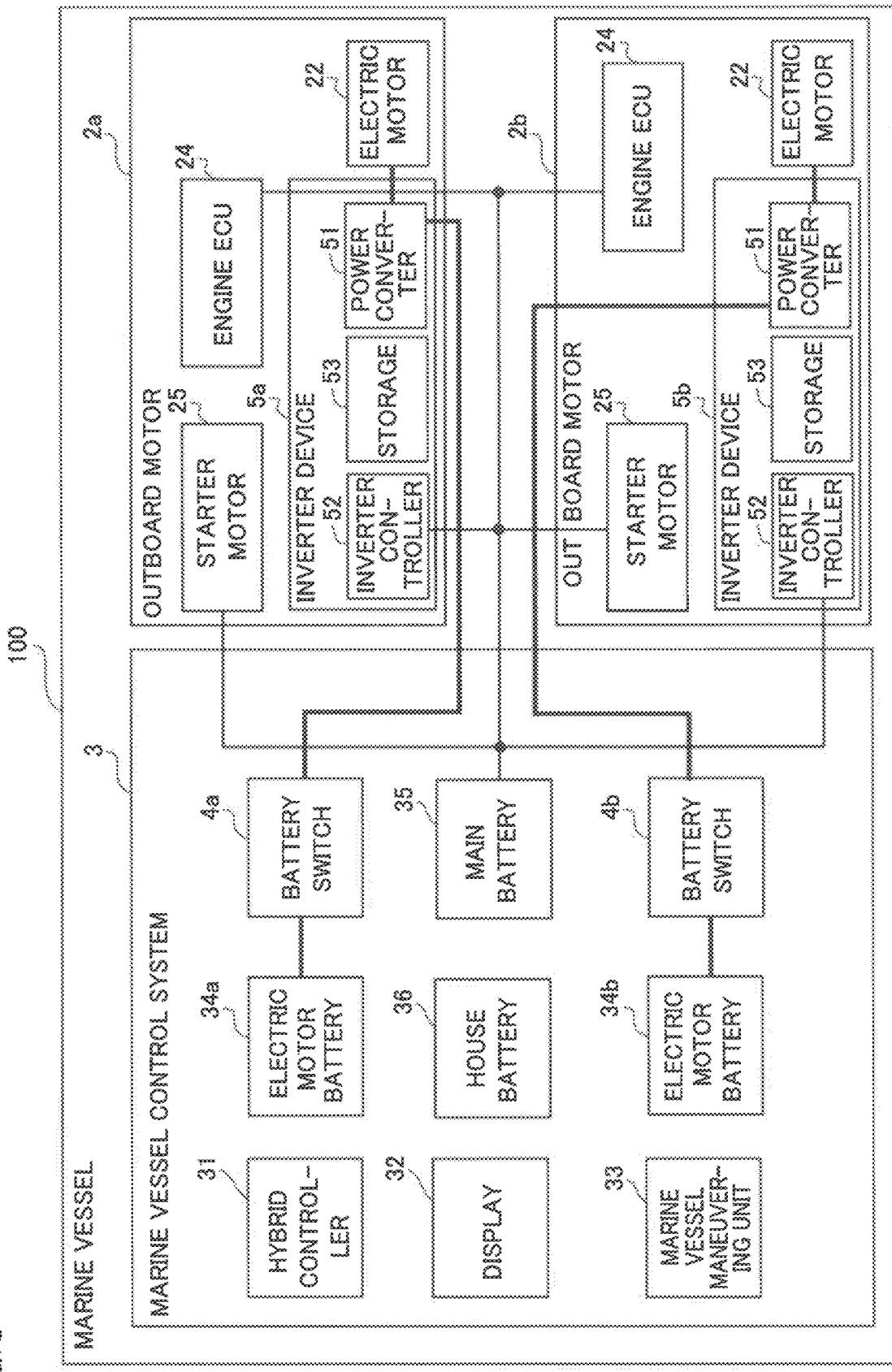
FIG. 3 is a block diagram showing the structure of a marine vessel according to a preferred embodiment of the present invention.

As shown in FIG. 3, the engine ECU 24 communicates with a hybrid controller 31 described below and the inverter device 5a or 5b provided in its own outboard motor 2a or 2b. For example, the engine ECU 24 transmits and receives information and command signals to and from the hybrid controller 31 and the inverter device 5a or 5b by control area network (CAN) communication. Furthermore, the engine ECUs 24 are connected to a main battery 35, and operate using power from the main battery 35.

The starter motors 25 start the engines 21. Specifically, the starter motors 25 are connected to the main battery 35, and are driven using power from the main battery 35. The starter motors 25 rotate (crank) crankshafts of the engines 21 based on commands from the engine ECUs 24 (hybrid controller 31). The engines 21 are cranked by the starter motors 25, fuel is supplied into the engines 21 by fuel suppliers (not shown), and the fuel in the engines 21 is ignited by igniters (not shown) to start the engines 21. Power is supplied from the main battery 35 to the fuel suppliers and the igniters.

The marine vessel control system 3 includes the hybrid controller 31, a display 32, a marine vessel maneuvering unit 33, the electric motor batteries 34a and 34b, the main battery 35, a house battery 36, battery switches 4a and 4b, and inverter devices 5a and 5b. The hybrid controller 31 is an example of a "controller". The display 32 is an example of a "notifier". The electric motor batteries 34a and 34b are examples of a "first battery". The main battery 35 is an example of a "second battery" or a "third battery".

The hybrid controller 31, the display 32, the marine vessel maneuvering unit 33, the electric motor batteries 34a and 34b, the main battery 35, the house battery 36, and the battery switches 4a and 4b are provided in the hull 1, for example. The display 32 is positioned in the vicinity of the marine vessel maneuvering unit 33, for example. The display 32 is provided at a position visually recognized by a user who operates the marine vessel maneuvering unit 33. On the display 32, a gauge such as an engine speed is displayed. The inverter device 5a is provided in the outboard motor 2a. The inverter device 5b is provided in the outboard motor 2b.

The battery switches 4a and 4b are manually switched between on-states in which the electric motor batteries 34a and 34b are used and off-states in which the electric motor batteries 34a and 33b are not used, respectively.

Specifically, the battery switches 4a and 4b are connected in series between the electric motor battery 34a and the inverter device 5a and between the electric motor battery 34b and the inverter device 5b, respectively. The battery switch 4a is rotated or moved by the user such that a state in which the electric motor battery 34a and the inverter device 5a are conducted (the electric motor battery 34a is used) and a state in which the electric motor battery 34a and the inverter device 5a are shut off (the electric motor battery 34a is not used) are switched. Furthermore, the battery switch 4b is rotated or moved by the user such that a state in which the electric motor battery 34b and the inverter device 5b are conducted (the electric motor battery 34b is used) and a state in which the electric motor battery 34b and the inverter device 5b are shut off (the electric motor battery 34b is not used) are switched.

The hybrid controller 31 is, for example, a control circuit that controls both driving of the engines 21 in the outboard motors 2a and 2b and driving of the electric motors 22 in the outboard motors 2a and 2b. For example, the hybrid controller 31 includes a processor such as a CPU to perform an arithmetic process and the like. Specifically, the hybrid controller 31 is configured or programmed to perform a control to switch between an engine driving state in which the propellers 23 are driven by the engines 21 and an electric motor driving state in which the propellers 23 are driven by the electric motors 22. The hybrid controller 31 controls the outboard motors 2a and 2b in the electric motor driving state when the marine vessel 100 travels at a low speed, and controls the outboard motors 2a and 2b in the engine driving state when the marine vessel 100 travels at a high speed.

Figure 4:
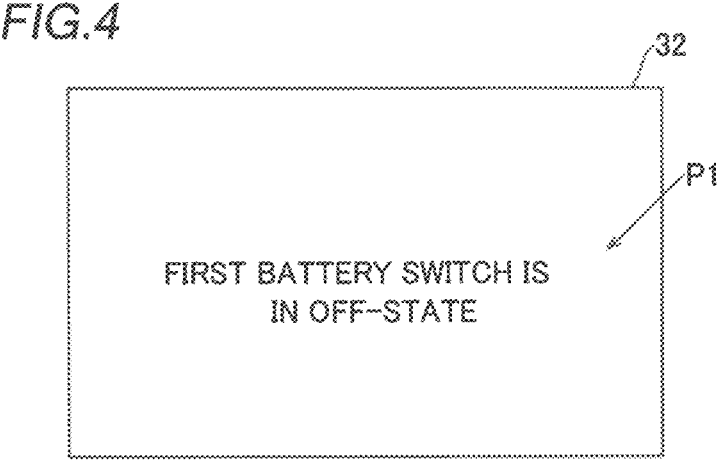
FIG. 4 is a diagram showing an example of a message image according to a preferred embodiment of the present invention.
Figure 5:
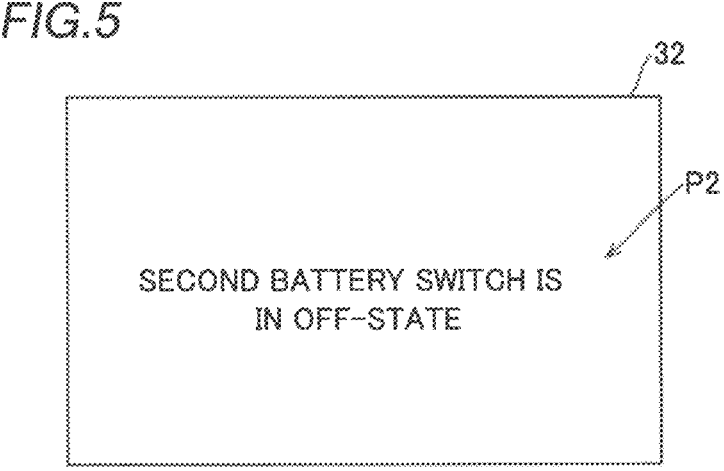
FIG. 5 is another diagram showing an example of a message image according to a preferred embodiment of the present invention.
Figure 6:
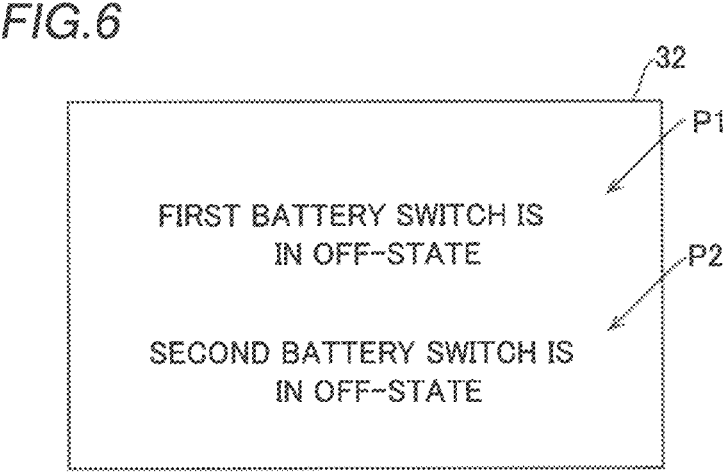
FIG. 6 is still another diagram showing an example of a message image according to a preferred embodiment of the present invention.

As shown in FIGS. 4 to 6, according to preferred embodiments of the present invention, the display 32 provides a notification indicating that at least one of the battery switch 4a or 4b is in an off-state when at least one of the battery switch 4a or 4b is in the off-state based on a command from the hybrid controller 31. In other words, the hybrid controller 31 is configured or programmed to control the display 32 to provide a notification indicating that at least one of the battery switch 4a or 4b is in the off-state when at least one of the battery switch 4a or 4b is in the off-state.

Specifically, as shown in FIG. 4, the display 32 displays a message image P1, "first battery switch is in off-state", when the battery switch 4a is in the off-state based on a command from the hybrid controller 31. As shown in FIG. 5, the display 32 displays a message image P2, "second battery switch is in off-state", when the battery switch 4b is in the off-state based on a command from the hybrid controller 31. As shown in FIG. 6, the display 32 displays both the message images P1 and P2 when both the battery switches 4a and 4b are in the off-states based on a command from the hybrid controller 31. The message images P1 and P2 are examples of "message information".

According to preferred embodiments of the present invention, the hybrid controller 31 is configured or programmed to control the display 32 to provide a notification indicating that at least one of the battery switch 4a or 4b is in the off-state and to control the engines 21 to start when power is supplied from the main battery 35 to the starter motors 25 and when at least one of the battery switch 4a or 4b is in the off-state. That is, the marine vessel 100 (both the outboard motors 2a and 2b) is able to start the engines 21 even when at least one of the battery switch 4a or 4b is in the off-state.

As shown in FIG. 3, the marine vessel maneuvering unit 33 includes a remote control, for example. The marine vessel maneuvering unit 33 receives input operations by the user and transmits operation signals based on the received input operations to the hybrid controller 31. The hybrid controller 31 controls the operation of the outboard motors 2a and 2b based on the operation signals.

The electric motor battery 34a, the electric motor battery 34b, the main battery 35, and the house battery 36 are separate from each other. The electric motor battery 34a supplies power to the electric motor 22 via the inverter device 5a. The electric motor battery 34b supplies power to the electric motor 22 via the inverter device 5b. The main battery 35 supplies power to each of the starter motors 25 that start the engines 21 of the outboard motors 2a and 2b. The house battery 36 supplies power to at least some devices (devices in house) other than the electric motors 22 and the starter motors 25 among the devices in the marine vessel 100. The electric motor batteries 34a and 34b, the main battery 35, and the house battery 36 are, for example, lead storage batteries or lithium-ion batteries.

The inverter devices 5a and 5b convert DC power from the electric motor batteries 34a and 34b into AC power based on commands from at least one of the hybrid controller 31 or the engine ECUs 24 to supply the AC power to the electric motors 22 of the outboard motors 2a and 2b in which the inverter devices 5a and 5b are located, respectively. The inverter device 5a is positioned between the battery switch 4a and the electric motor 22 of the outboard motor 2a. The inverter device 5b is positioned between the battery switch 4b and the electric motor 22 of the outboard motor 2b.

The inverter device 5a includes a power converter 51, an inverter controller 52, and a storage 53. The structure of the inverter device 5b is the same as that of the inverter device 5a. The inverter controller 52 is an example of a "power conversion controller".

Each of the power converters 51 includes a switching circuit. Each of the power converters 51 converts DC power from the battery switch 4a or 4b corresponding to its own outboard motor 2a or 2b into AC power to supply the AC power to the corresponding electric motor 22.

Each of the inverter controllers 52 includes a microcomputer. The inverter controllers 52 are configured or programmed to control the operation of the power converters 51. The inverter controller 52 provided in the outboard motor 2a is configured or programmed to detect that the battery switch 4a is in the off-state. Specifically, the inverter controller 52 detects that the battery switch 4a is in an on-state based on the electric motor battery 34a supplying power to the power converter 51 (a voltage being applied, for example), and detects that the battery switch 4a is in the off-state based on the electric motor battery 34a supplying no power to the power converter 51 (no voltage being applied, for example).

Figure 7:
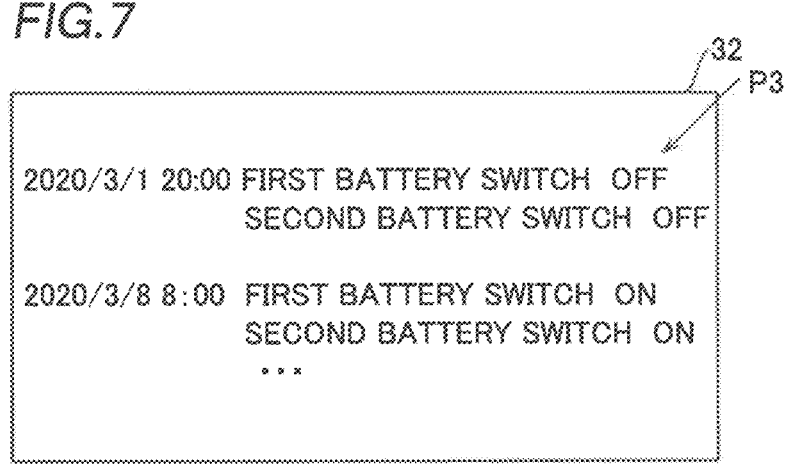
FIG. 7 is a diagram showing a display of detection results according to a preferred embodiment of the present invention.

Each of the storages 53 includes a non-volatile memory. Each of the storages 53 stores the date and time and information (detection result) indicating whether the battery switch 4a or 4b is in the off-state or the battery switch 4a or 4b is in the on-state in association with each other based on a command from the inverter controller 52. As shown in FIG. 7, the hybrid controller 31 reads information in which the date and time and the detection result are associated with each other by accessing each of the storages 53, and controls the display 32 to display an image P3, which is the information in which the date and time and the detection result are associated with each other.

Figure 8:
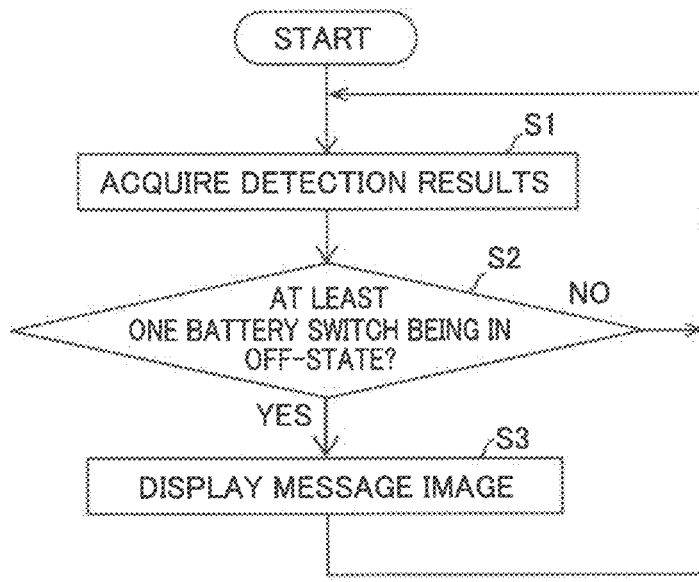
FIG. 8 is a flowchart showing a control process of a marine vessel control system according to a preferred embodiment of the present invention.

A method for controlling the marine vessel 100 according to preferred embodiments of the present invention is now described with reference to FIG. 8. FIG. 8 shows a flowchart of a control process in the marine vessel 100. The following control process is executed by the hybrid controller 31 and the inverter controllers 52.

In step S1, the inverter controller 52 of the outboard motor 2a acquires the detection result of whether or not the battery switch 4a is in the off-state, and the inverter controller 52 of the outboard motor 2b acquires the detection result of whether or not the battery switch 4b is in the off-state. Then, the process advances to step S2.

In step S2, the hybrid controller 31 determines whether or not at least one of the battery switch 4a or 4b is in the off-state. When at least one of the battery switch 4a or 4b is in the off-state, the process advances to step S3, and when each of the battery switches 4a and 4b is not in the off-state (is in the on-state), the process returns to step S1.

In step S3, at least one of the message image P1 indicating that the battery switch 4a is in the off-state or the message image P2 indicating that the battery switch 4b is in the off-state is displayed on the display 32. Then, the process returns to step S1.

When power is supplied from the main battery 35 to the starter motors 25, the engines 21 are started even when at least one of the message image P1 or P2 is displayed.

In the structure according to the various preferred embodiments described above, the following advantageous effects are achieved.

According to a preferred embodiment of the present invention, the marine vessel control system 3 includes the display 32 to provide a notification indicating that at least one of the battery switch 4a or 4b is in the off-state when at least one of the battery switch 4a or 4b is in the off-state. Accordingly, the display 32 notifies the user that at least one of the battery switch 4a or 4b is in the off-state. Consequently, even when power is supplied to the outboard motors 2a and 2b including the engines 21 and the electric motors 22, traveling of the marine vessel 100 without the user being aware that the battery switch 4a or 4b is in the off-state is significantly reduced or prevented.

According to a preferred embodiment of the present invention, the marine vessel control system 3 includes the hybrid controller 31 configured or programmed to control the display 32 to provide a notification indicating that at least one of the battery switch 4a or 4b is in the off-state when at least one of the battery switch 4a or 4b is in the off-state. Accordingly, the display 32 is easily controlled using the hybrid controller 31.

According to a preferred embodiment of the present invention, the hybrid controller 31 is configured or programmed to control the display 32 to provide a display indicating that at least one of the battery switch 4a or 4b is in the off-state when at least one of the battery switch 4a or 4b is in the off-state. Accordingly, the user easily recognizes that at least one of the battery switch 4a or 4b is in the off-state by visually recognizing the display 32.

According to a preferred embodiment of the present invention, the hybrid controller 31 is configured or programmed to control the display 32 to display at least one of the message image P1 or P2 indicating that at least one of the battery switch 4a or 4b is in the off-state when at least one of the battery switch 4a or 4b is in the off-state. Accordingly, the user easily recognizes that at least one of the battery switch 4a or 4b is in the off-state by visually recognizing at least one of the message image P1 or P2 on the display 32 and reading the message content.

According to a preferred embodiment of the present invention, the hybrid controller 31 is configured or programmed to perform a control to switch between the engine driving state in which the propellers 23 are driven by the engines 21 and the electric motor driving state in which the propellers 23 are driven by the electric motors 22. Accordingly, the hybrid controller 31 defines and functions as a controller for a hybrid system configured or programmed to perform a control to switch between the engine driving state and the electric motor driving state, and also defines and functions as a controller configured or programmed to control the display 32. Consequently, as compared with a case in which the controller for the hybrid system is separate from the controller configured or programmed to control the display 32, a complex structure of the marine vessel 100 including the marine vessel control system 3 is significantly reduced or prevented.

According to a preferred embodiment of the present invention, the marine vessel control system 3 includes the starter motors 25 connected to the engines 21 to start the engines 21, and the main battery 35 provided separately from the electric motor batteries 34a and 34b to supply power to the starter motors 25. Furthermore, the hybrid controller 31 is configured or programmed to control the display 32 to provide a notification indicating that at least one of the battery switch 4a or 4b is in the off-state and to control the engines 21 to start when power is supplied from the main battery 35 to the starter motors 25 and when at least one of the battery switch 4a or 4b is in the off-state. Accordingly, the engines 21 are started even when the notification indicating that at least one of the battery switch 4a or 4b is in the off-state is provided. Consequently, even when at least one of the battery switch 4a or 4b is in the off-state, the engines 21 are started when the user desires to start the engines 21.

According to a preferred embodiment of the present invention, the marine vessel control system 3 includes the inverter devices 5a and 5b (inverter controllers 52) provided between the battery switches 4a and 4b and the electric motors 22 to detect that at least one of the battery switch 4a or 4b is in the off-state. Accordingly, the user easily recognizes that at least one of the battery switch 4a or 4b is in the off-state through the display 32 based on the detection results detected by the inverter controllers 52.

According to a preferred embodiment of the present invention, the marine vessel control system 3 includes the power converters 51 to convert the DC power from the battery switches 4a and 4b into AC power to supply the AC power to the electric motors 22, and the inverter controllers 52 configured or programmed to control the operation of the power converters 51. Accordingly, it is not necessary to provide a dedicated controller to detect that at least one of the battery switch 4a or 4b is in the off-state. Thus, an increase in the number of components of the marine vessel control system 3 is significantly reduced or prevented, and a complex structure of the marine vessel control system 3 is significantly reduced or prevented.

According to a preferred embodiment of the present invention, the marine vessel control system 3 includes the main battery 35 provided separately from the electric motor batteries 34a and 34b to supply power to the inverter controllers 52. Accordingly, even when power is not supplied from the electric motor batteries 34a and 34b to the inverter controllers 52, the inverter controllers 52 detect that at least one of the battery switch 4a or 4b is in the off-state using the power from the main battery 35.

According to a preferred embodiment of the present invention, the marine vessel control system 3 includes the storages 53 to store the detection results detected by the inverter controllers 52. Accordingly, the user or a maintenance worker is able to retroactively confirm the detection results stored in the storages 53.

According to a preferred embodiment of the present invention, the marine vessel control system 3 includes the electric motor batteries 34a and 34b, and the battery switches 4a and 4b. Furthermore, the display 32 provides a notification indicating that at least one of the battery switch 4a or 4b is in the off-state when at least one of a plurality of battery switches 4a and 4b is in the off-state. Accordingly, even when the battery switches 4a and 4b are provided, the user is notified that at least one of the battery switch 4a or 4b is in the off-state when at least one of the battery switch 4a or 4b is in the off-state.

In the control method according to the various preferred embodiments described above, the following advantageous effects are achieved.

According to a preferred embodiment of the present invention, even when power is supplied to the outboard motors 2a and 2b including the engines 21 and the electric motors 22, traveling of the marine vessel 100 without the user being aware that the battery switch 4a or 4b is the off-state is significantly reduced or prevented, similarly to the structure of the marine vessel control system 3.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the marine vessel is preferably an outboard motor boat in the preferred embodiments described above, the present invention is not restricted to this. That is, the marine vessel may alternatively be a marine vessel other than an outboard motor boat. For example, the marine vessel may be a marine vessel including an inboard motor(s), an inboard-outboard motor(s), or a jet propulsion device(s).

While the main battery, the electric motor batteries, and the house battery are preferably provided in the hull in the preferred embodiments described above, the present invention is not restricted to this. That is, at least one of the main battery, the electric motor batteries, or the house battery may alternatively be provided in the outboard motors.

While power is preferably supplied from the electric motor batteries only to the electric motors via the inverter devices in the preferred embodiments described above, the present invention is not restricted to this. That is, power may alternatively be supplied from the electric motor batteries to other devices in addition to the electric motors.

While two battery switches are preferably provided in the preferred embodiments described above, the present invention is not restricted to this. That is, one common battery switch may alternatively be provided for a plurality of electric motor batteries, or three or more battery switches may alternatively be provided.

While the display preferably provides a notification indicating that the battery switch is in the off-state in the preferred embodiments described above, the present invention is not restricted to this. For example, a sound output may alternatively be provided in the marine vessel, and the sound output may alternatively provide a notification indicating that the battery switch is in the off-state.

While the display preferably displays the message image indicating that the battery switch is in the off-state in the preferred embodiments described above, the present invention is not restricted to this. For example, the display may alternatively display a warning light indicating that the battery switch is in the off-state without using a character image.

While the hybrid controller preferably controls the display as a notifier in the preferred embodiments described above, the present invention is not restricted to this. For example, the marine vessel control system may alternatively include a controller dedicated for the display as a notifier separately from the hybrid controller.

While each of the inverter controllers preferably detects that the battery switch is in the off-state in the preferred embodiments described above, the present invention is not restricted to this. For example, a detector may alternatively be provided to detect that the battery switch is in the off-state by detecting a voltage or current in a path between the battery switch and the inverter device, or a detector may alternatively be provided to detect that the battery switch is in the off-state by detecting the state (such as the rotation angle or position) of the battery switch.

While power is preferably supplied from the main battery to the inverter controllers in the preferred embodiments described above, the present invention is not restricted to this. For example, power may alternatively be supplied from the house battery to the inverter controllers.

While the storages are preferably provided in the inverter devices in the preferred embodiments described above, the present invention is not restricted to this. For example, the storages may alternatively be provided in the hull.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine power supply system that supplies power to a marine propulsion unit including a propulsion generator that generates a propulsive force to propel a marine vessel, an engine that drives the propulsion generator, and an electric motor that drives the propulsion generator, the marine power supply system comprising:
a first battery to supply power to the electric motor;
a battery switch to be manually switched between an on-state in which the first battery is used and an off-state in which the first battery is not used; and
a notifier to provide a notification indicating that the battery switch is in the off-state when the battery switch is in the off-state without providing a notification to the user indicating that the battery switch is in the on-state when the battery switch is in the on-state.

2. The marine power supply system according to claim 1, further comprising:
a controller configured or programmed to control the notifier to provide the notification indicating that the battery switch is in the off-state when the battery switch is in the off-state.

3. The marine power supply system according to claim 2, wherein
the notifier includes a display; and
the controller is configured or programmed to control the display to provide a display indicating that the battery switch is in the off-state when the battery switch is in the off-state.

4. The marine power supply system according to claim 3, wherein the controller is configured or programmed to control the display to display message information indicating that the battery switch is in the off-state when the battery switch is in the off-state.

5. The marine power supply system according to claim 2, wherein the controller is configured or programmed to perform a control to switch between an engine driving state in which the propulsion generator is driven by the engine and an electric motor driving state in which the propulsion generator is driven by the electric motor.

6. The marine power supply system according to claim 5, further comprising:
a starter connected to the engine to start the engine; and
a second battery provided separately from the first battery to supply power to the starter; wherein
the controller is configured or programmed to control the notifier to provide the notification indicating that the battery switch is in the off-state and to control the engine to start when power is supplied from the second battery to the starter and when the battery switch is in the off-state.

7. The marine power supply system according to claim 1, further comprising:
a detector provided between the battery switch and the electric motor to detect that the battery switch is in the off-state.

8. The marine power supply system according to claim 7, further comprising:
a power converter to convert DC power from the battery switch into AC power to supply the AC power to the electric motor; and
a power conversion controller configured or programmed to control operation of the power converter and to also define and function as the detector.

9. The marine power supply system according to claim 8, further comprising:
a third battery provided separately from the first battery to supply power to the power conversion controller.

10. The marine power supply system according to claim 7, further comprising:
a storage to store a detection result detected by the detector.

11. The marine power supply system according to claim 1, wherein
the first battery includes a plurality of first batteries;
the battery switch includes a plurality of battery switches; and
the notifier provides a notification indicating that at least one of the plurality of battery switches is in the off-state when the at least one of the plurality of battery switches is in the off-state.

12. A method for controlling a marine power supply system that supplies power to a marine propulsion unit including a propulsion generator that generates a propulsive force to propel a marine vessel, an engine that drives the propulsion generator, and an electric motor that drives the propulsion generator, the marine power supply system including a starter connected to the engine to start the engine and a second battery provided separately from the first battery to supply power to the starter, the method comprising:
determining that a battery switch to be manually switched between an on-state in which a first battery that supplies power to the electric motor is used and an off-state in which the first battery is not used is in the off-state by a controller; and
providing a notification indicating that the battery switch is in the off-state based on the determining that the battery switch is in the off-state without providing a notification to the user indicating that the battery switch is in the on-state when the battery switch is in the on-state; wherein
the providing the notification includes providing the notification indicating that the battery switch is in the off-state, and starting the engine when power is supplied from the second battery to the starter and the battery switch is in the off-state.

13. The method according to claim 12, wherein the providing of the notification includes providing a display indicating that the battery switch is in the off-state when the battery switch is in the off-state.

14. The method according to claim 13, wherein the providing of the notification includes displaying message information indicating that the battery switch is in the off-state when the battery switch is in the off-state.

15. The method according to claim 12, further comprising:
detecting that the battery switch is in the off-state; wherein
the providing of the notification includes providing the notification indicating that the battery switch is in the off-state based on detecting that the battery switch is in the off-state.

16. The method according to claim 15, wherein the detecting includes detecting that the battery switch is in the off-state with a power conversion controller configured or programmed to control operation of a power converter that converts DC power from the battery switch into AC power to supply the AC power to the electric motor.

17. The method according to claim 16, wherein
the marine power supply system further includes a third battery provided separately from the first battery to supply power to the power conversion controller; and
the detecting includes detecting that the battery switch is in the off-state by using the power conversion controller using the power from the third battery.

18. The method according to claim 15, further comprising:
storing a detected detection result after the detecting.

19. The method according to claim 12, wherein
the first battery includes a plurality of first batteries;
the battery switch includes a plurality of battery switches; and
the providing of the notification includes providing a notification indicating that at least one of the plurality of battery switches is in the off-state when the at least one of the plurality of battery switches is in the off-state.

20. A method for controlling a marine power supply system that supplies power to a marine propulsion unit including a propulsion generator that generates a propulsive force to propel a marine vessel, an engine that drives the propulsion generator, and an electric motor that drives the propulsion generator, the method comprising:
- determining that a battery switch to be manually switched between an on-state in which a first battery that supplies power to the electric motor is used and an off-state in which the first battery is not used is in the off-state by a controller;
- providing a notification indicating that the battery switch is in the off-state based on the determining that the battery switch is in the off-state without providing a notification to the user indicating that the battery switch is in the on-state when the battery switch is in the on-state; and
- detecting that the battery switch is in the off-state with a power conversion controller configured or programmed to control operation of a power converter that converts DC power from the battery switch into AC power to supply the AC power to the electric motor.

\* \* \* \* \*